(12) United States Patent
Stolarczyk et al.

(10) Patent No.: US 6,778,127 B2
(45) Date of Patent: Aug. 17, 2004

(54) DRILLSTRING RADAR

(76) Inventors: Larry G. Stolarczyk, 848 Clayton Hwy., Raton, NM (US) 87740; Gerald L. Stolarczyk, 848 Clayton Hwy., Raton, NM (US) 87740

( * ) Notice: Subject to any disclaimer, the term of this patent is extended or adjusted under 35 U.S.C. 154(b) by 0 days.

(21) Appl. No.: 10/287,041

(22) Filed: Nov. 4, 2002

(65) Prior Publication Data

US 2003/0102995 A1 Jun. 5, 2003

Related U.S. Application Data

(63) Continuation-in-part of application No. 10/161,378, filed on Jun. 4, 2002, and a continuation-in-part of application No. 09/820,498, filed on Mar. 28, 2001, now Pat. No. 6,522,285.
(60) Provisional application No. 60/335,520, filed on Oct. 31, 2001, and provisional application No. 60/315,149, filed on Aug. 27, 2001.

(51) Int. Cl.[7] .......................... G01S 13/88; G01S 13/00
(52) U.S. Cl. .......................... 342/22; 342/118; 342/175; 342/194; 342/195; 342/196
(58) Field of Search .............................. 342/21, 22, 61, 342/70, 71, 118, 127–146, 194–197; 299/1.05, 1.1, 1.2–1.9, 3, 4, 5, 6, 10–18; 324/323, 332, 333–344, 629, 637, 642, 644; 702/9; 175/24, 25, 26, 27, 40, 41, 42, 43, 44, 45

(56) References Cited

U.S. PATENT DOCUMENTS

| | | | | |
|---|---|---|---|---|
| 4,297,699 A | * | 10/1981 | Fowler et al. | 342/22 |
| 4,430,653 A | * | 2/1984 | Coon et al. | 342/22 |
| 4,545,017 A | * | 10/1985 | Richardson | 702/9 |
| 4,577,153 A | | 3/1986 | Stolarczyk | |
| 4,691,166 A | | 9/1987 | Stolarczyk | |
| RE32,563 E | | 12/1987 | Stolarczyk | |
| 4,742,305 A | | 5/1988 | Stolarczyk | |
| 4,753,484 A | | 6/1988 | Stolarczyk | |
| 4,777,652 A | | 10/1988 | Stolarczyk | |
| 4,814,768 A | * | 3/1989 | Chang | 342/22 |
| 4,879,755 A | | 11/1989 | Stolarczyk | |
| 4,916,400 A | * | 4/1990 | Best et al. | 324/338 |

(List continued on next page.)

Primary Examiner—Bernarr E. Gregory
(74) Attorney, Agent, or Firm—Richard B. Main (57) ABSTRACT

A drillstring radar comprises a measurements-while-drilling instrument for mounting just behind the drill bit and downhole motor of a drill rod. The instrument includes a radar system connected to upward-looking and downward-looking horn antennas. These are used to electronically probe the interface of a coal seam with its upper and lower boundary layers. A dielectric constant sensor is included to provide corrective data for the up and down distance measurements. Such measurements and data are radio communicated to the surface for tomographic processing and user display. The instrument also includes a navigation processor and drill bit steering controls. The radio communication uses the drillstring as a transmission line and F1/F2 repeaters can be placed along very long runs to maintain good instrument-to-surface communication. A docking mechanism associated with the instrument and its antenna array allows the instrument to be retrieved back inside the drillstring with a tether should the drill head become hopelessly jammed or locked into the earth.

14 Claims, 6 Drawing Sheets

U.S. PATENT DOCUMENTS

| | | | |
|---|---|---|---|
| RE33,458 E | 11/1990 | Stolarczyk | |
| 4,968,978 A | 11/1990 | Stolarczyk | |
| 4,994,747 A | 2/1991 | Stolarczyk | |
| 5,066,917 A | 11/1991 | Stolarczyk | |
| 5,072,172 A | 12/1991 | Stolarczyk | |
| 5,087,099 A | 2/1992 | Stolarczyk | |
| 5,093,929 A | 3/1992 | Stolarczyk | |
| 5,121,971 A | 6/1992 | Stolarczyk | |
| 5,146,611 A | 9/1992 | Stolarczyk | |
| 5,181,934 A | 1/1993 | Stolarczyk | |
| 5,188,426 A | 2/1993 | Stolarczyk | |
| 5,246,273 A * | 9/1993 | Rosar | 299/4 |
| 5,260,660 A | 11/1993 | Stolarczyk | |
| 5,268,683 A | 12/1993 | Stolarczyk | |
| 5,301,082 A | 4/1994 | Stolarczyk | |
| 5,408,182 A | 4/1995 | Stolarczyk | |
| 5,474,261 A | 12/1995 | Stolarczyk | |
| 5,500,649 A * | 3/1996 | Mowrey et al. | 342/22 |
| 5,552,786 A * | 9/1996 | Xia et al. | 342/22 |
| 5,686,841 A | 11/1997 | Stolarczyk | |
| 5,720,354 A * | 2/1998 | Stump et al. | 175/26 |
| 5,769,503 A | 6/1998 | Stolarczyk | |
| 5,904,210 A * | 5/1999 | Stump et al. | 175/45 |
| 6,161,630 A * | 12/2000 | Stump et al. | 175/26 |
| 6,315,062 B1 * | 11/2001 | Alft et al. | 175/45 |
| 6,435,286 B1 * | 8/2002 | Stump et al. | 175/26 |
| 6,460,936 B1 * | 10/2002 | Abramov et al. | 299/17 |
| 6,484,818 B2 * | 11/2002 | Alft et al. | 175/45 |

* cited by examiner

DRILLSTRING RADAR

RELATED APPLICATION

This Application is a continuation-in-part of both U.S. patent application Ser. No. 09/820,498, filed Mar. 28, 2001, titled GROUND-PENETRATING IMAGING AND DETECTING RADAR now U.S. Pat. No. 6,522,285; and, U.S. patent application Ser. No. 10/161,378, filed Jun. 04, 2002, and titled SHUTTLE-IN RECEIVER FOR RADIO-IMAGING UNDERGROUND GEOLOGIC STRUCTURES. The latter of which further claims priority by virtue of U.S. Provisional Patent Applications, serial No. 60/315,149, filed Aug. 27, 2001, and titled RADAR-NAVIGATION TOOL FOR MINING COAL, and Serial No. 60/335,520, filed Oct. 31, 2001. Such Applications are incorporated herein by reference.

BACKGROUND OF THE INVENTION

1. Field of the Invention

The invention relates generally to directional drilling navigation of boreholes in coal seams, and more specifically to radars and control systems for keeping the borehole drilling to the vertical center of the coal deposit.

2. Description of the Prior Art

The production of coal and methane depends upon the environment of the original coal bed deposit, and any subsequent alterations. During burial of the peat-coal swamp, sedimentation formed the sealing mudstone/shale layer overlying the coal bed. In deltaic deposits, high-energy paleochannels meandered from the main river channel. Oftentimes, the channels scoured through the sealing layer and into the coal seam.

High porosity sandstone channels often fill with water. Under the paleochannel scour cut bank, water flows into the face and butt cleats of the coal bed. Subsequent alterations of the seam by differential compaction cause the dip, called a roll, to occur in the coal bed. Faults are pathways for water flow into the coal bed.

Drilling into the coal bed underlying a paleochannel and subsequent fracking can enable significant flows of water to enter. The current state of the art in horizontal drilling uses gamma sensors in a measurements-while-drilling (MWD) navigation subsystem to determine when the drill approaches a sedimentary boundary rock. But if sandstone is protruding into the coal, such as results from ancient river bed cutting and filling, then the gamma sensor will not help. Sandstone does not have significant gamma emissions, so this type of detection is unreliable. Drilling within the seam cannot be maintained when the seam is not bounded by sealing rock.

Methane diffusion into a de-gas hole improves whenever the drillhole keeps to the vertical center of the coal seam. It also improves when the drillhole is near a dry paleochannel. Current horizontal drilling technology can be improved by geologic sensing and controlling of the drilling horizon in a coal seam.

One present inventor, Larry G. Stolarczyk, has described methods and equipment for imaging coal formations in geologic structures in many United States Patents. Some of those Patents are listed in Table I, and are incorporated herein by reference.

TABLE I

| Patent No. | Issued | Title |
|---|---|---|
| 4577153 | Mar. 18, 1986 | Continuous Wave Medium Frequency Signal Transmission Survey Procedure For Imaging Structure In Coal Seams |
| 4691166 | Sep. 1, 1987 | Electromagnetic Instruments For Imaging Structure In Geologic Formations |
| 4742305 | May 3, 1988 | Method For Constructing Vertical Images Of Anomalies In Geological Formations |
| 4753484 | Jun. 28, 1988 | Method For Remote Control Of A Coal Shearer |
| 4777652 | Oct. 11, 1988 | Radio Communication Systems For Underground Mines |
| 4879755 | Nov. 7, 1989 | Medium Frequency Mine Communication System |
| 4968978 | Nov. 6, 1990 | Long Range Multiple Point Wireless Control And Monitoring System |
| 4994747 | Feb. 19, 1991 | Method And Apparatus For Detecting Underground Electrically Conductive Objects |
| 5066917 | Nov. 19, 1991 | Long Feature Vertical Or Horizontal Electrical Conductor Detection Methodology Using Phase Coherent Electromagnetic Instrumentation |
| 5072172 | Dec. 10, 1991 | Method And Apparatus For Measuring The Thickness Of A Layer Of Geologic Material Using A Microstrip Antenna |
| 5087099 | Feb. 11, 1992 | Long Range Multiple Point Wireless Control And Monitoring System |
| 5093929 | Mar. 3, 1992 | Medium Frequency Mine Communication System |
| 5121971 | Jun. 16, 1992 | Method Of Measuring Uncut Coal Rib Thickness In A Mine |
| 5146611 | Sep. 8, 1992 | Mine Communication Cable And Method For Use |
| 5181934 | Jan. 26, 1993 | Method For Automatically Adjusting The Cutting Drum Position Of A Resource Cutting Machine |
| 5188426 | Feb. 23, 1993 | Method For Controlling The Thickness Of A Layer Of Material In A Seam |
| 5260660 | Nov. 9, 1993 | Method For Calibrating A Downhole Receiver Used In Electromagnetic Instrumentation For Detecting An Underground Conductor |
| 5268683 | Dec. 7, 1993 | Method Of Transmitting Data From A Drillhead |
| 5301082 | Apr. 5, 1994 | Current Limiter Circuit |
| 5408182 | Apr. 18, 1995 | Facility And Method For The Detection And Monitoring Of Plumes Below A Waste Containment Site With Radiowave Tomography Scattering Methods |
| 5474261 | Dec. 12, 1995 | Ice Detection Apparatus For Transportation Safety |
| 5686841 | Nov. 11, 1997 | Apparatus And Method For The Detection And Measurement Of Liquid Water And Ice Layers On The Surfaces Of Solid Materials |
| 5769503 | Jun. 23, 1998 | Method And Apparatus For A Rotating Cutting Drum Or Arm Mounted With Paired Opposite Circular Polarity Antennas And Resonant Microstrip Patch Transceiver For Measuring Coal, Trona And Potash Layers Forward, Side And Around A Continuous Mining Machine |
| RE032563 | Dec. 15, 1987 | Continuous Wave Medium Frequency Signal Transmission Survey Procedure For Imaging Structure In Coal Seams |
| RE033458 | Nov. 27, 1990 | Method For Constructing Vertical Images Of Anomalies In Geological Formations |

The present inventor, Larry Stolarczyk, describes the measuring of the thickness of ground deposit layers with a microstrip antenna, in U.S. Pat. No. 5,072,172, issued Dec. 10, 1991. Interpolation tables are used to lookup the layer thickness values corresponding to antenna conductance and resonance measurements. Such resonant microstrip patch antenna (RMPA) and their resulting measurements are used to guide coal-seam drum-cutter equipment for more efficient mining of natural deposit ores. The RMPA driving-point impedance ($S_{11}$) changes significantly when a solid, gas, or liquid layer thickness overlying the RMPA varies.

U.S. Pat. No. 5,769,503, issued Jun. 23, 1998, to Stolarczyk, et al., describes mounting such RMPA on a rotating drum or arm of a coal, trona, or potash mining machine. A ground-penetrating-radar transmitting antenna and a receiving antenna can be mounted on a cutting drum to detect deeply buried objects and anomalous geology just ahead of the mining. A radar frequency downconverter is used so low-cost yet-accurate measurement electronics can be built. A first phase-locked loop (PLL) is operated at the resonant frequency of the patch antenna or at each sequentially stepped radar frequency. A second PLL is offset from the first PLL by an intermediate frequency (IF) and is called a tracking PLL. The measurement speed can be delayed by the sequential way in which the PLL's lock on to signals, so a solution to that delay is described.

The calibration curves represent an analytical function that has been reconstructed from a set of discrete I and Q data points measured at each height (H). The discrete sensor height calibration data can be used to construct two different polynomials with the independent variable being the physical layer thickness or height (H). The physical height (H) is independently measured with acoustic height measurement electronics during the calibration process or by other means, such as an inclinometer on the boom of a mining machine. The two calibration polynomials are, $$I(H) = Re\ H = b_n H^n + b_{n-1} H^{n-1} + \ldots + b_1 H + b_o \quad (1A)$$

and $$Q(H) = Im\ H = a_n H^n + a_{n-1} H^{n-1} + \ldots + a_1 H + a_o \quad (1B)$$

U.S. Pat. No. 5,325,095, describes a modulator that sequentially creates in-phase (I) and quadrature phase (Q) shifts in a frequency source signal. The frequency source signal is sequentially shifted by 0° or 180° (in-phase), then by 90° or 270° (quadrature) in passing through the phase modulator to the radar transmit antenna. The electronic circuits employ isolators. Isolators and quadrature modulator transmitters are costly and difficult to build with wide bandwidth. The receiver section of the radar receives the reflected signals from the target and uses a single frequency conversion design to transpose the received radar signal frequency to a lower frequency range where the I and Q signal measurements are sequentially made at each frequency in the stepped-frequency radar method that has become one of the standard ground penetrating radar practices. The I and Q signals contain the antenna sensor information. As is well known in the art, the sensor information is processed in a Fourier transform to convert frequency domain information to time domain information. The time domain information is used to determine the time ($t_o$) for the signal energy to travel to and return back to the radar. By knowing the velocity (v) in a dielectric natural media such as coal $$v = \frac{c}{\sqrt{\varepsilon_c}}$$

where c is the speed of light, $\varepsilon_c$ is the relative dielectric constant of coal (about 6). The distance to the reflective target is $$d = \frac{c}{2\sqrt{\varepsilon_c}} t_o.$$

The relative dielectric constant must therefore be known to accurately to determine distance.

The velocity formula is made more complex whenever the natural media layer is not coal, trona, or some other high-resistivity liquid or solid. The velocity of radio waves generally depends on the frequency and resistivity of the natural medium. It is therefore preferable to simultaneously measure the in-situ dielectric constant, e.g., when using radar to measure depths. Stepped-frequency radars have separate transmitting and receiving antennas, and are circularly polarized antennae. But printed circuit antennas radiate front and back. To counter this, U.S. Pat. No. 5,325,095, teaches the placement of radar-energy absorbing material on one side of the printed circuit board to reduce the back lobe.

The antenna pattern is directed only to one side of the printed circuit antenna. Such antennas are preferably oppositely polarized so that they can be operated in continuous wave (CW) mode and in close proximity to each other. The transmitter and receiver sections operate concurrently. The radar return signals from the target will typically be repolarized opposite to the transmitted signal. The reflected wave can thus be readily measured by the receiving antenna and associated electronics. But not all the reflected signals are oppositely polarized. An electromagnetic wave traveling in a first media and into a second media is reflected at the interface.

Electromagnetic wave reflection occurs at the interface of two different dielectric media, and the reflection coefficient can be expressed in Equation (2) as, $$\Gamma = \frac{E_s}{E_p} = \frac{\sqrt{\varepsilon_1} - \sqrt{\varepsilon_2}}{\sqrt{\varepsilon_2} + \sqrt{\varepsilon_1}} ; \frac{\sigma}{\omega \varepsilon} \ll 1 \quad (2)$$

where, $E_s$ is the reflected electric field component of the electromagnetic wave, a vector; $E_p$ is the incident electric field component of the electromagnetic wave, a vector; $\varepsilon_1$ is the relative dielectric constant of the first media; $\varepsilon_2$ is the relative dielectric constant of the second media; $\sigma$ is the electrical conductivity of the media; and, $\omega = 2\pi f$ and f is the frequency of the EM wave.

SUMMARY OF THE PRESENT INVENTION

Briefly, a drillstring radar embodiment of the present invention comprises a measurements-while-drilling instrument for mounting just behind the drill bit and downhole motor of a drill rod. The instrument includes a ground-penetrating radar system connected to upward-looking and downward-looking horn antennas. These are used to electronically probe the interface of a coal seam with its upper and lower boundary layers. A dielectric constant sensor is included to provide corrective data for the up and down distance measurements. Such measurements and data are radio communicated to the surface for tomographic processing and user display. The instrument also includes a navigation processor and drill bit steering controls. The radio communication uses the drillstring as a transmission line and F1/F2 repeaters can be placed along very long runs to maintain good instrument-to-surface communication. A docking mechanism associated with the instrument and its antenna array allows the instrument to be retrieved back inside the drillstring with a tether should the drill head become hopelessly jammed or locked into the earth.

An advantage of the present invention is that a drillstring radar is provided that helps keep boreholes in the middle of a coal bed.

Another advantage of the present invention is that a drillstring radar is provided that can guide directional drilling in real-time.

A further advantage of the present invention is better yeilds of method can be realized because the boreholes are restricted to the optimum middle ground within a coal bed layer.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENTS

Figure 1:
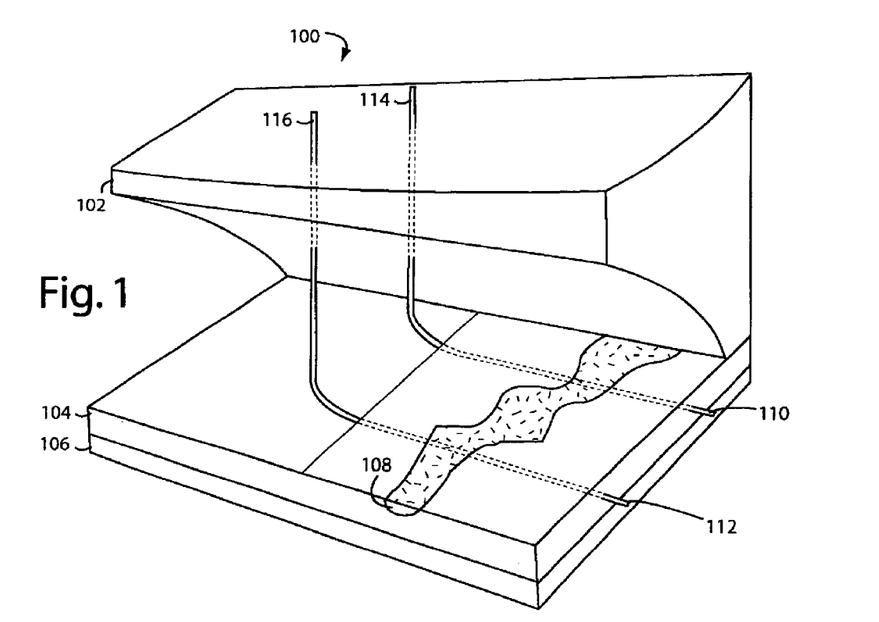
FIG. 1 is a diagram of a coal mine operation in an embodiment of the present invention that uses directional drilling and measurements-while-drilling radar to guide the drilling of horizontal boreholes in the vertical centers of coal deposits.

FIG. 1 illustrates a coal mine operation 100 in its earliest stages of development. An overburden 102 of soils covers a coal layer 104. This in turn overlies a deeper substrate layer 106. The coal layer 104 may be interrupted by a fault or scouring that happened over geologic time and was filled with sandstone, e.g., a paleochannel 108. At a minimum, the coal layer will undulate and vary in thickness.

The sandstone in paleochannel 108 is porous and can be saturated with water. If so, flooding of the coal mine can occur from overhead if the coal layer just under the paleochannel is faulted or cut. It is therefore in the economic and safety interests of mining operations to avoid punching through such paleochannel 108 when taking the coal in coal layer 104.

The coal layer 104 will typically contain valuable reserves of methane gas that can be pumped out through a network of horizontally running boreholes 110 and 112. These boreholes are begun as vertical bores 114 and 116 using a directional drilling method.

Figure 2:
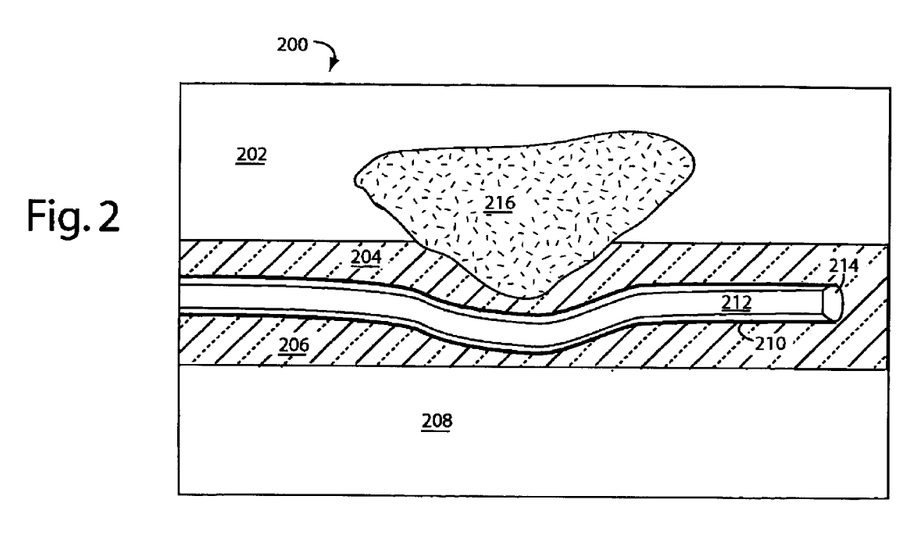
FIG. 2 is a cross sectional diagram of a coal deposit, similar to FIG. 1, in which a sandstone paleochannel is protruding from the ceiling of the coal deposit, and in which the drilling of a horizontal borehole has dived down below the paleochannel to stay within the middle of the coal.

FIG. 2 illustrates a horizontal drilling operation 200. An overburden 202 sits on top of a coal bed deposit represented by an upper coal deposit 204 and a lower coal deposit 206. These overlie a deeper substrate 208. The coal bed deposit is preferably drilled such that a horizontal borehole 210 is vertically equidistant between upper and lower coal deposits 204 and 206. In some situations, the horizontal borehole 210 may need to be lined with a perforated plastic pipe that lacks perforations in the water saturated areas.

Such horizontal borehole 210 is drilled by a drillstring 212 that has a steerable, directional drillhead 214. A paleochannel 216 filled with sandstone and probably saturated with water represents a common hazard in such mining. FIG. 2 shows that the horizontal borehole 210 has been drilled to stay in the middle of whatever vertical space there is to work within the upper and lower coal deposits 204 and 206. Such guidance while drilling requires a non-invasive probing of the deposits ahead of the drilling that is provided by embodiments of the present invention.

A natural waveguide occurs in layered coal seam sedimentary geology because there is a contrast between the electrical conductivity of the coal and that of shale, mudstone, and/or fire clay. The conductivity of coal is about 0.0005 S/m (2,000 ohm-meters). So dry coal is a pretty good insulator. The typical bounding layers have electrical conductivity in the range of 0.01 to 0.1 Siemens per meter (S/m). Such 20:1 conductivity contrast creates a natural waveguide, and any induced electromagnetic (EM) waves will travel along inside the coal bed layer.

An electric field (EZ) component of the traveling EM wave is vertically polarized, and the magnetic field (Hy) component is horizontally polarized in the seam. The energy in this part of the EM wave travels laterally in the coal seam from a transmitter to a receiver, e.g., a Stolar Horizon Radio Imaging Method (RIM) receiver. A horizontally polarized electric field (EX) component has a zero value near the vertical center of the seam, and is maximum at the sedimentary rock-coal interface. It is this EX component that is responsible for EM wave signal transmission into the boundary rock layer. The energy in this part of the EM wave travels vertically in the coal deposit.

In such waveguide, the coal seam radiowave magnitude diminishes over distance for two reasons. The first is the attenuation rate of the waveguide. The second is the radial spreading of wave energy as it travels away from the transmitter. The cylindrical spread can be mathematically represented by $$\frac{1}{\sqrt{r}},$$

where r is the distance from the transmitting to receiving antenna. This compares with a non-waveguide far field spherically spreading factor of $$\frac{1}{r}.$$

Thus, at hundred meters, the magnitude of the seam EM wave decreases by a factor of only ten in the waveguide, and by a factor of hundred in an unbounded media.

A significant advantage of the seam waveguide is signals can travel farther. Another advantage is that the traveling electromagnetic wave predominantly remains within the coal seam waveguide.

Such coal seam electromagnetic wave is very sensitive to changes in the waveguide geology. The radiowave attenuation rate and the phase shift can be measured and the measurements will reveal structural features of the coal seam. If the waveguide were uniform, then the path would be a straight line. The straight line path is an assumption used in the Algebraic Reconstruction Technique (ART) tomography algorithm. But radiowaves are refracted near significant geologic anomalies causing the travel path of the radiowave to bend and be longer than in the uniform waveguide case. Such bending cannot be accounted for in ART processing and so causes an error. But, by measuring the total path phase shift, the bending effect can be accounted for in Full Wave Inversion Code (FWIC), a tomography reconstruction algorithm. The waveguide attenuation effect reduces the magnitude of the electromagnetic wave along the path.

It has been observed that the coal seam attenuation rate will increase with signal frequency. The wavelength increases as frequency decreases. By lowering the operating frequency, the measurement range increases. But such range still depends on coal seam thickness, the type of bounding sedimentary rock, and the electrical conductivity of the coal.

Intrusions of sandstone sedimentary rock into the coal seam increase the attenuation rate at that point. This is because more of the signal travels vertically into the boundary rock and leaks from the waveguide. If water has invaded the coal, then any wet clay in the coal will cause the electrical conductivity to decrease and the attenuation-rate/phase-shift to increase. Such effects allow tomography to be used to image such geologic anomalies.

The attenuation-rate/phase-shift rapidly increases with decreasing seam height, so coal seam thinning can be easily detected. Higher attenuation-rate areas suggest that the coal seam boundary rock is changing, the seam is rapidly thinning, or/and water has invaded the coal seam.

Faults and dykes in the coal seam will cause signal reflections within the waveguide. Such reflections can appear as excess path loss, but can be differentiated as being caused by faults and dykes in the coal by also taking phase shift measurements.

The preferred operating frequency band extends from a few kilohertz to well over 300 kHz. The few kilohertz lower limit is due to the practical problems in building low frequency antennas with their longer wavelengths, and the high frequency limit is due to the increased coal seam waveguide attenuation rate with frequency. Instrument design and tomographic image processing algorithms can greatly increase coal seam imaging resolution.

Tomographic ART images often have in the direction of the signal wave propagation. The ART algorithm assumes that the coal seam waveguide signal travels on a straight ray path. Severe geologic anomalies can cause signal refraction, in which case the ray-path assumption fails.

Referring again to FIG. 2, the drillstring 212 preferably includes a radar system with both upward and downward looking antennas to non-invasively determine the vertical middle of coal layers 204 and 206. Such further preferably includes a dielectric-constant measuring sensor and an inductive radio for communicating measured data to the surface.

For example, the drillstring 212 includes at its distal end behind drillhead 214 a measure-while-drilling (MWD) instrument with a stepped-frequency radar operating in the 1.7 to 2.5-GHz range. Typically, fifty frequency steps are used to cover the frequency range. At each frequency step, in-phase (I) and quadrature (Q) radar return signal values are measured and transmitted to a user display at the ground surface. The I and Q values for all step frequencies are decoded and processed in a fast Fourier transform (FFT) to derive the time domain response from each of the roof and floor to the coal interface. The distances to each interface can then be determined from these measurements by taking into account the relative dielectric constant.

Alternatively, since the object of steering the drillstring 212 is to stay in the vertical middle of the coal seam 204 and 206, the raw measurements from the upward-looking and downward-looking radar antennas can be compared in their raw uncorrected state to see if they are about the same. If so, the measurements can be assumed to have occurred at the vertical middle, e.g., equidistant to ceiling and floor. In such cases, the corrective information for each from the dielectric-constant sensor can be dispensed with.

In order to acquire accurate geologic data while drilling through coal seams, the radar acquired distance data must be corrected for relative dielectric constant ($\epsilon r$) to determine the actual physical distance. In such case, the instrumentation must include a local dielectric-constant measuring capability.

The FFT computations needed for real-time MWD is very computer-intensive. With the present state-of-the-art in microprocessors, the measured data must be processed above ground where larger, more capable computers an be operated. Such computers also demand operating power that is too much for battery operation in the drillstring 212. Therefore the measurements are communicated along the drillstring, e.g., using inductively coupled radio communication.

Such upward-looking and downward-looking radar can also determine the type of boundary rock in the roof and floor. Regions of high coal seam where the relative dielectric constant is high, e.g., greater than 6.0, are unattractive because they produce greater amounts of water in the methane drainage system. Any coal deposit set under a paleochannel and having a dielectric constant under 6.0 suggests that the paleochannel is dry and will contain methane. Drilling near dry paleochannels increases methane production.

Conventional horizontal drilling navigation systems cannot directly determine seam thickness or changes in seam orientation, dips and rolls, without trial-and-error exploratory drilling of the floor and the roof in the same region of the panel. Thus, when the seam horizon changes, the drill will impact the roof or floor. A drilling machine operator with such conventional methods detects when the drill is on the roof or floor horizon by evidence of rock in the cuttings. The drilling technician redirects the drill motor to try to keep the drill within the seam. The borehole that results wanders between the roof and floor of the coal seam along its path. Punching through to roof or floor interfaces can invite ground water to inundate the borehole.

Figure 3:
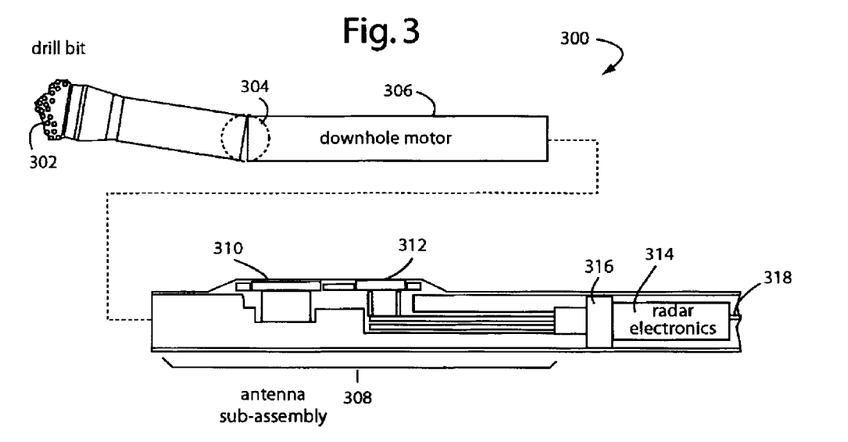
FIG. 3 is a diagram of a downhole drilling motor subassembly embodiment of the present invention, and a cross sectional view of the antenna subassembly portion.

FIG. 3 illustrates a downhole drilling motor subassembly embodiment of the present invention, and is referred to herein by the general reference numeral 300. The downhole drilling motor subassembly 300 comprises a drill bit 302, a directional steering gimbal 304, a downhole motor 306, an antenna subassembly 308 with a radar antenna 310 and a dielectric-constant sensor 312, and a radar electronics 314.

If the drill bit 302 and downhole motor 306 become hopelessly jammed in the earth and cannot be withdrawn or advanced, the radar electronics can be salvaged nevertheless. A docking socket and plug 316 allows the radar electronics 314 to be pulled back inside the length of the drillstring to the surface with a tether 318. The docking socket and plug 316 are also such that the radar electronics 314 can be hydraulically pumped down from the surface inside the drillstring to automatically dock and electrically mate. Alternatively, such docking mechanism can be located so the radar antennas 310 and 312 can also be withdrawn by tether 318 along with the radar electronics 314.

The downhole motor 306 is powered by a flow of water forced down the drillstring from the surface at a pressure of 600-psi and flowrate of 75-gpm. Some of this hydraulic energy can be converted to electricity for use by the downhole electronics. The drill bit 302 is not coaxial with downhole motor 306 by virtue of a bend at gimbal 304. Such bend is on the order of a few degrees and allows directional drilling by rotating the drillstring. For example, rotating the drillstring to 0° the drilling will head up, at 90° and 270° the drilling will turn left or right, and at 180° the drilling will dive down. Alternatively, the gimbal 304 can be articulated so that it can steer the directional drilling without having to rotate the whole drillstring. A gimbal directional drilling control may include four separate hydraulic operated pressure pads orthogonally distributed. When the 180° pad is pushed out, the drill motor will bore upward. The other directional pads are pushed out for different directions.

Figure 4:
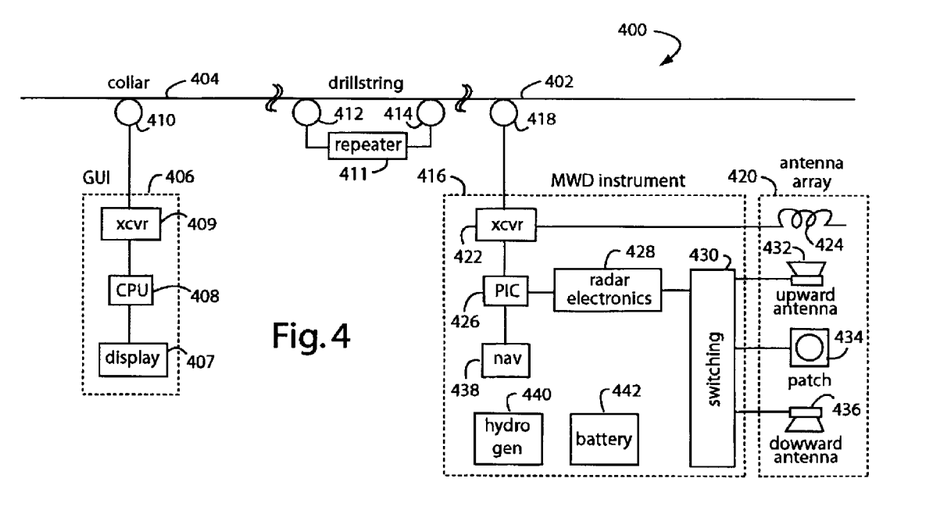
FIG. 4 is a functional block diagram of a drillstring radar embodiment of the present invention, and shows the electronic components and their relationships as used in the equipment of FIGS. 1–3.

FIG. 4 illustrates a drillstring radar embodiment of the present invention, and is referred to herein by the general reference numeral 400. The drillstring radar 400 comprises a downhole drillstring 402 connected to a surface collar 404. A graphical user interface (GUI) 406 is positioned at the surface and processes tomographic images of the measurements-while-drilling on a user display 407. A microcomputer (CPU) 408 does data logging and processes raw data received by a transceiver 409 from the downhole equipment. A signal coupler 410 allows the transceiver 409 to use the collar 404 and drillstring 402 as a common transmission line. A radio repeater 411 repeats and amplifies "F1/F2" signals through its couplers 412 and 414. If the drillstring 402 is relatively short, and signal attenuation is not severe, then repeater 411 may not be needed. A measurements-while-drilling (MWD) instrument 416 is connected to the radio signals on the drillstring 402 by a coupler 418. Coupler 418 is operated at about 100-kHz and typical comprises 14-turns of Litz-wire on a 12-inch long coil one inch wide and mounted edge onto the drill rod. An antenna array 420 is associated with the MWD instrument 416 and both are closely associated at the distal end of drillstring 402 behind the drill bit.

The MWD instrument 416 is typically packaged in a pipe section 1-⅝ inch in diameter and nine feet long. It comprises a radio transceiver 422 that is connected to a HMD antenna 424. Such antenna 424 is operated at about 125-kHz and typical comprises 14-turns of Litz-wire on a 24-inch long ferrite rod one inch in diameter. It communicates with other radar imaging equipment collocated in another parallel borehole. A more complete description of how this antenna 424 is used and how associated radar imaging equipment located in associated parallel boreholes can be used to advantage in coal deposit imaging, is provided in other U.S. patent applications of the present inventor, e.g., Ser. No. 10/259,912, filed Sep. 30, 2002, and titled, RADIO-IMAGING OF UNDERGROUND STRUCTURES. Such are incorporated herein by reference.

A processor (PIC) 426 interfaces the raw measurements from a radar electronics system 428 to the transceiver 422.

A switching matrix 430 allows the selection of an upward-looking radar horn antenna 432, a resonant microstrip patch antenna (RMPA) 434, and a downward-looking radar horn antenna 436. Such horn antennas are preferably operated in the 2.0–2.5 GHz frequency band and have at least 20-dB of back-lobe rejection. A navigation processor 438 receives control signals in real-time to guide the direction of drilling according to measurements obtained by the radar electronics 428. For example, a model 544 angular orientation sensor manufactured by Applied Physics Systems (APS) can be used for the navigation processor 438. The miniature size is ideal for the MWD tool. The roll and pitch accuracy is ±1.5 degrees, and azimuth is ±0.2 degrees. Such unit calculates the roll, pitch, and yaw values, and has an RS-232 output format that can be transmitted by the radio data transmission system.

Electrical power for the MWD instrument 416 can be provided by a hydro-generator 440 that taps into the hydraulic fluid flow through the drillstring, or by a rechargeable battery 442, or both.

The MWD instrument 416 is preferably retractable should the drillstring 402 become stuck in the drillhole. For example, the MWD instrument is equipped with a self-docking mechanism to interconnect with the antenna array subsection drill rod. A retractable capability permits the MWD instrument and repeater to be hydraulically pumped-in and pulled out of the drillstring. Such a shuttle mechanism is described by the present inventor in U.S. patent application Ser. No. 10/161,378, filed Jun. 04, 2002, and titled SHUTTLE-IN RECEIVER FOR RADIO-IMAGING UNDERGROUND GEOLOGIC STRUCTURES. Alternatively, a docking mechanism associated with the MWD instrument 416 and its antenna array 420 allows the MWD instrument to be retrieved back inside the drillstring with a tether should the drill head become hopelessly jammed or locked into the earth.

The antenna array 420 is preferably designed to accommodate the radar and dielectric microwave antennas, the radar transmitter antenna, and the data transmission antenna. For economy, the radar transmitter function can use the transmitter section of the data transceiver 422 during periods that data is not being sent to the surface collar. The MWD instrument 416 is placed inside a beryllium-copper drill rod section, e.g., ten feet long. In one instance, the antenna array and MWD instrument was located fifteen feet behind the downhole motor.

Figure 5:
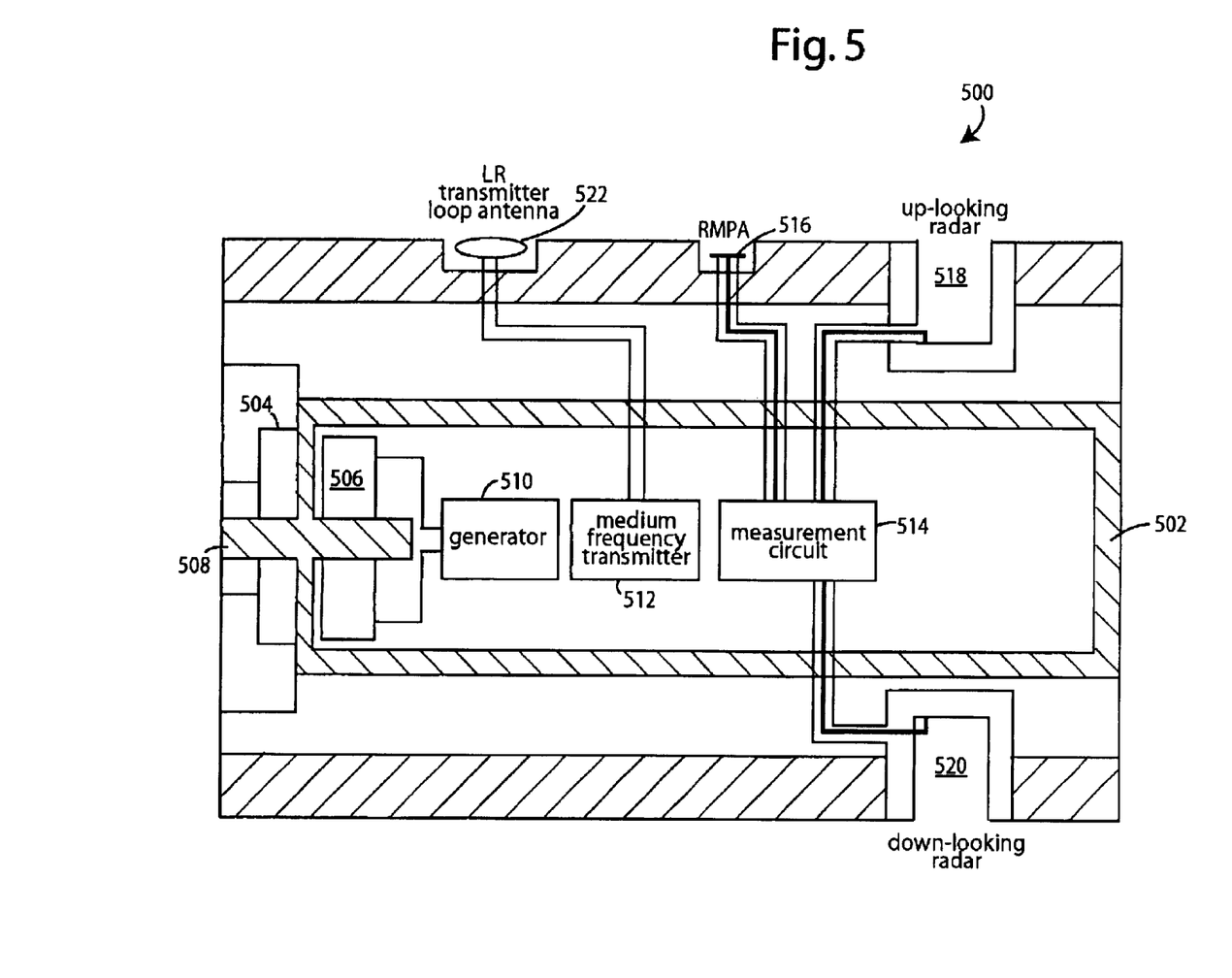
FIG. 5 is a mechanical cross-sectional and electrical functional block diagram of a drill rod radar system embodiment of the present invention, and is one way to implement the antenna subassembly portion of the equipment illustrated in FIGS. 3 and 4.

FIG. 5 illustrates a borehole drill rod radar system 500 built with the circuits described in FIG. 4. A dielectrically loaded feed of a conventional horn antenna is mounted flush on the surface of the drum or drill-steel to provide a forward-looking radar with minimum back-lobe to detect geologic anomalies ahead of mining. This radar antenna, when combined with RMPA dielectric constant measurements, enables the accurate measurement of distance.

In general, embodiments of the present invention include methods for measuring a reflection port signal for a three-port directional coupler with its output port directly connected to the driving-point of a conventional horn antenna. The reflection port is connected through a first balanced mixer. A 0°/90° phase shifter rotates the signal phase between a forward coupling port of the three-port directional coupler and a second beat frequency balanced mixer. A first beat frequency balanced mixer injection signal is phase coherent with the reflection signal, thereby canceling the phase shift of the PLL. The impedance of the sensor antenna in close proximity to natural media is made as close as possible to the characteristic impedance of the three-port directional coupler, preferably fifty ohms. The beat frequency occurs with phase-coherent mixing in mixer M4 so as to cancel the phase drift of the crystal oscillator and create in-phase (I) and quadrature (Q) signals derived from the reflection port signal. Such can be used in remote sensing and imaging of non-metallic and metallic landmines.

One method of calibrating the sensor antenna uses sets of polynomial equations wherein the independent variable represents the value to be measured. Alternative embodiments include solving for the value of the independent variable (H) from a set of polynomial equations that is the difference between the calibration polynomial equation and the measured values of I and Q. Alternative embodiments include determining the value of the independent variable ($H_o$) by independent means and using the difference between the measured and calibration polynomial value to detect and image the object. Other embodiments determine the independent variable as being related to a material thickness, dielectric constant, in-situ stress.

The measurements obtained from embodiments of the present invention can be tomographically processed to construct two and three-dimensional images of the object, e.g., a silhouette image of the object and its associated signal-to-noise ratio. The signal-to-noise ratio and the width of the reconstructed object are generally related to the probability of the object's detection.

Referring again to FIG. 5 the drill rod radar 500 represents an alternative construction to the antenna subassembly 308 and radar electronics 314 of FIG. 3. Such drill rod radar 500 comprises an explosion-proof housing 502 into which power must be supplied without using wires or commutator brushes. A pair of coupled magnets 504 and 506 turns on an axle 508 to spin an electrical generator 510. The magnets 504 and 506 form a kind of magnetic clutch that is able to engage through a beryllium-copper wall of the explosion-proof housing 502. The generator 510 supplies operating power to a medium-frequency transmitter 512 and a microwave radar measurement circuit 514.

An RMPA antenna sensor 516 is used to determine a relative dielectric constant ($\epsilon_c$) of any coal surrounding the drill rod radar 500. The dielectric constant of coal is affected by how much moisture is in the coal. Upward and downward-looking radar horns 518 and 520 each provide I and Q signals at each stepped frequency that are interpreted by the microwave radar measurement circuit 514. The distance through the coal layer to a sedimentary interface can be determined from the radar data once the dielectric constant of the natural media has been determined.

The drill rod radar 500 is typically operated to step through a range of frequencies, e.g., from 2.7 GHz to 3.1 GHz. Each I and Q measurement preferably provides at least ten bits of digital data. A matching medium frequency receiver and computer at a more convenient location are used to determine the product of distance and the dielectric constant, e.g., using fast Fourier transformation (FFT) methods. The I-and-Q data, and RMPA data can be transmitted as described in U.S. Pat. No. 5,268,683, issued to Larry Stolarczyk on Dec. 7, 1993. Such patent is incorporated herein by reference.

The MWD instrument 416 in FIG. 4 is retractable should the drillstring 400 become stuck in the drillhole. The MWD instrument is 1-⅝ inches in diameter and equipped with a self-docking mechanism to interconnect antenna.

Figure 6:
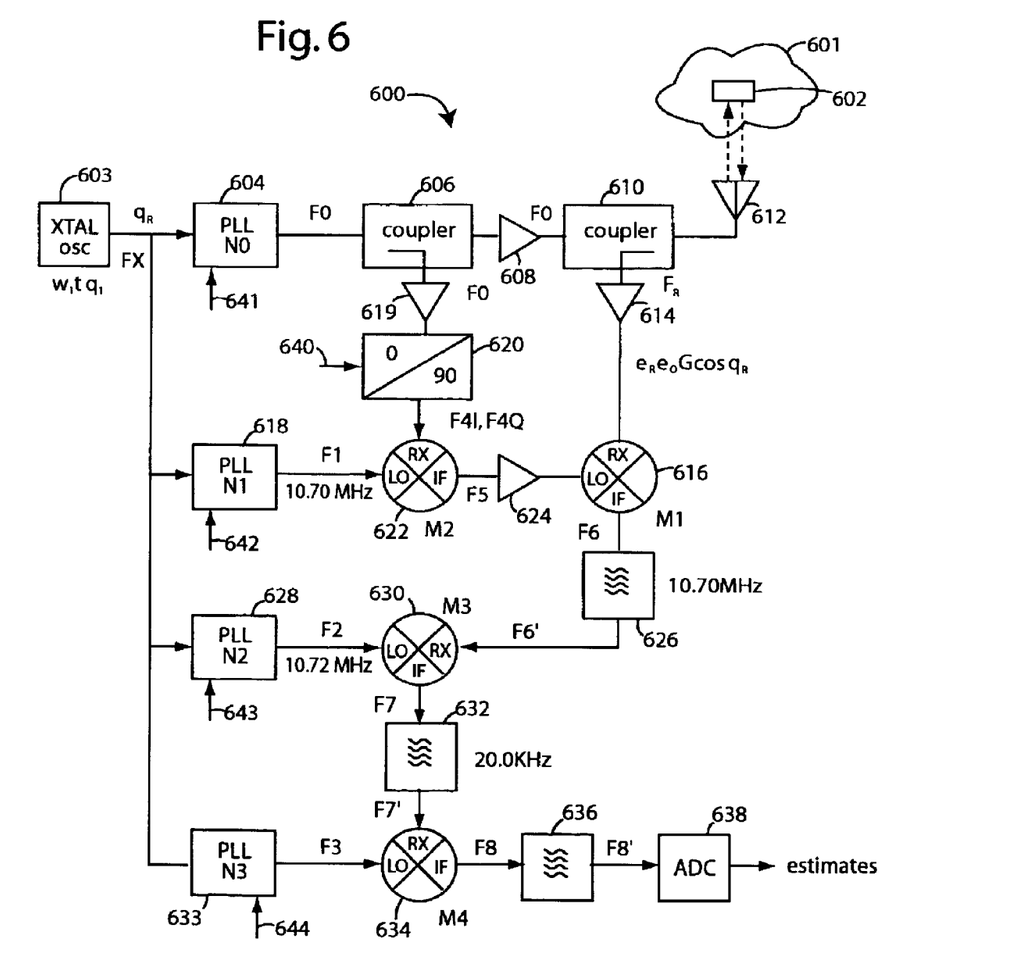
FIG. 6 is a schematic diagram of a ground-penetrating radar system embodiment of the present invention, and is one way to implement the radar electronics portion of the equipment illustrated in FIGS. 3 and 4.

FIG. 6 illustrates a ground-penetrating radar system embodiment of the present invention, and is referred to herein by the general reference numeral 600. Such could be used as radar electronics 314 in FIG. 3 or 428 in FIG. 4. The ground-penetrating radar system 600 is used to non-invasively penetrate a coal seam 601 with microwave radio energy to find a boundary rock interface 602. The system 600 includes a local oscillator 603 that produces a reference frequency (FX) with reference phase ($\theta_1$). A first phase-locked loop (PLL) 604 synthesizes a radio frequency F0, an integer harmonic of FX. The radio frequency F0 is passed to a forward-coupling port of a power splitter 606. An output port is connected to a wideband isolation amplifier 608. A three-port directional coupler 610 one-way couples the transmit signal out to a directional radar antenna 612 which illuminates the coal seam 601 and produces reflected waves from the boundary rock interface 602 with the coal seam 601. A reflection port of the three-port directional coupler 610 is used for measurements, e.g., where $e_R = e_o \Gamma \cos \theta_R$, the reflected energy is a function of the output energy of antenna 612.

During operation, such directional radar antenna 612 is moved close to a natural media or ground surface. A deliberate impedance mismatch is thus created that will result in higher levels of coupler reflection port output voltage or standing wave ratio (VSWR). Any impedance mismatches appearing at any of the ports on a directional coupler will reduce its directivity and isolation between ports. Wideband isolation amplifiers are used to stop reflected waves from reaching the transmitter stages and causing impedance mismatches. The balanced mixers are particularly susceptible to performance degradations under uncontrolled conditions.

Radar signals radiated from the directional radar antenna 612 enter the natural media or ground and are reflected back attenuated and with a change of phase. A wideband isolation amplifier 614 forwards the reflected-wave sample to a first balanced mixer (M1) 616.

A second PLL 618 synthesizes a coherent frequency F1, e.g., 10.70 MHz. A sample of the transmitted signal is provided by the power splitter 606 and a second wideband isolation amplifier 619 to a selectable 0°/90° phase shifter 620. A balanced mixer (M2) 622 provides an intermediate frequency (IF) F5 that is output by a third wideband isolation amplifier 624. The result is a suppressed-carrier signal with upper and lower sidebands offset from the carrier frequency by 10.70 MHz. This in turn mixes with RF in balanced mixer (M1) 616 to produce a first intermediate frequency (IF) F6. A bandpass filter 626 produces an output F6'. A third PLL 628 synthesizes another coherent frequency (F2), e.g., 10.720 MHz. This is combined with F6' in a balanced mixer 630 to produce a relatively low-frequency IF signal F7, e.g., 20.0 KHz.

Both the oscillator phase shift $\theta_1$ and the frequency are multiplied by $N_o$ to create the output frequency $N_o \omega_1$. The phase shift $N_o \omega_1$, is canceled on mixer M1. The coupler reflection port voltage $e_R$ dependence on load plane impedance is mathematically represented by Equation (3). The reflection coefficient ($\Gamma$) is a complex number that can be represented as a vector magnitude with phase angle $\theta_R$. Trigonometric identities are used and filter theory is applied to find that, $$F_{S_I}{}^1 = k\Gamma \cos \theta_R$$

and $$F_{S_Q}{}^1 = k\Gamma \sin \theta_R \qquad (6)$$

The ratio of these direct current (DC) values and the inverse tangent values solves for the reflection phase angle $\theta_R$. The constant k is determinable after instrument calibration. The magnitude of the reflection coefficient can be found from either of the above two equations. The measured values of $\Gamma$ and $\theta_R$ can be applied in Equation (3) to determine the load plane impedance.

A bandpass filter 632 produces a signal F7'. A fourth PLL 633 synthesizes another radio frequency (F3). The radio frequency is applied to the LO part of the fourth balanced mixer (M4) 634. Heterodyning produces a signal output F8. An integrating filter 636 processes and outputs a signal F8'. The phase drift ($\theta_1$) in local oscillator 603 is automatically cancelled and does not appear in the output. An analog to digital converter (ADC) 638 outputs a digital signal format, e.g., for further processing by a computer.

A control line 640 selects a 0° or 90° phase-shift through the phase shifter, and this will cause the system 600 to output in-phase or quadrature measurements, e.g., as represented by a DC output voltage of the ADC 638. This control line is typically connected to the same microprocessor that receives the digitized estimates from ADC 638. Such arrangement provides time-multiplexed I and Q amplitude estimates that are indexed to a calibration table, like FIG. 7, to find the depth to the boundary rock interface 602 or the thickness of the coal seam 601 covering the object. The microprocessor is preferably further provided with control signals 641–644 so that the F0–F3 frequencies can be digitally manipulated, e.g., for best transmission penetration and receiver sensitivity on-the-fly as different kinds of media 601 and objects 602 are inspected.

The estimates can be processed to provide landmine detection, guide drilling or excavation operations, control mining equipment, find lost buried objects in the soil, etc.

The three-port directional coupler 610 is preferably located near the RMPA antenna 612 and is connected to it by a short coaxial cable or strip line. The RMPA antenna 612 is preferably placed close to a natural media surface so the driving-point impedance of an antenna can be adjusted to match the characteristic impedance of the coupler. This technique will maximize the sensitivity of the coupler reflection port signal to small changes in antenna driving-point impedance. An antenna driving-point impedance adjustment is therefore preferred, e.g., with a variable slot built into the antenna structure capacitor.

The balanced mixer placed between the coupler reflected port and the first balanced mixer is such that the signals that modulate the coupler reflection output are phase coherent with the transmit signal. Sidebands are thus produced that represent the phase and amplitude information in the reflection signals. The rest of the circuitry demodulates the information from the carrier.

The output signal of the second balanced modulator (M2) is mixed with a coherent sample of the transmit signal in the first balanced mixer. After filtering, such signal will faithfully replicate the reflection port signal. This simplifies the transceiver design and enables accurate signal measurements with low cost synchronous detection circuits.

Figure 7:
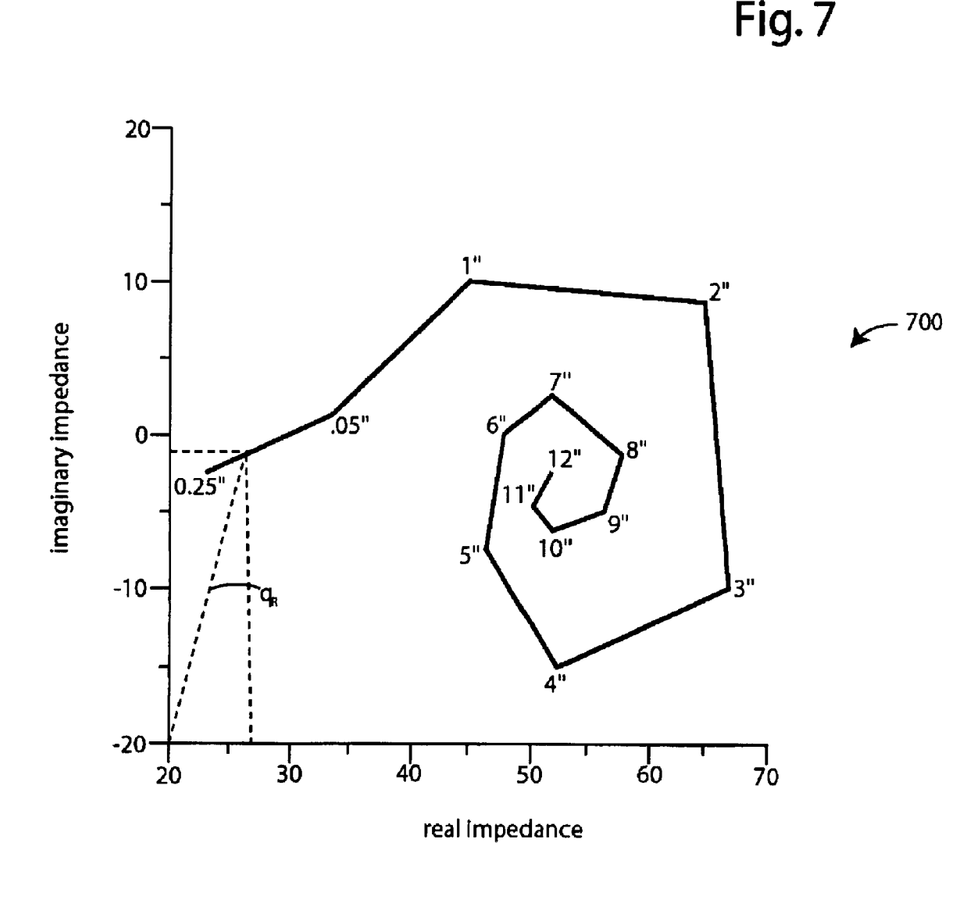
FIG. 7 is a graph of the typical driving-point real and imaginary impedance variations seen in the system of FIG. 1 for various thicknesses of a coal layer deposit.

FIG. 7 charts the relationships that typically develop between the RMPA antenna and the depth to the object and measured values for real (in-phase, I) and imaginary (quadrature-phase, Q). The two vector components of RMPA impedance, real and imaginary, vary differently as a nearby media layer thickness changes. Plotting the imaginary on the Y-axis and the real on the X-axis of a graph yields a calibration curve 700 that spirals to a vanishing point with increasing layer thickness, e.g., from 0.25 to twelve inches.

Figure 8:
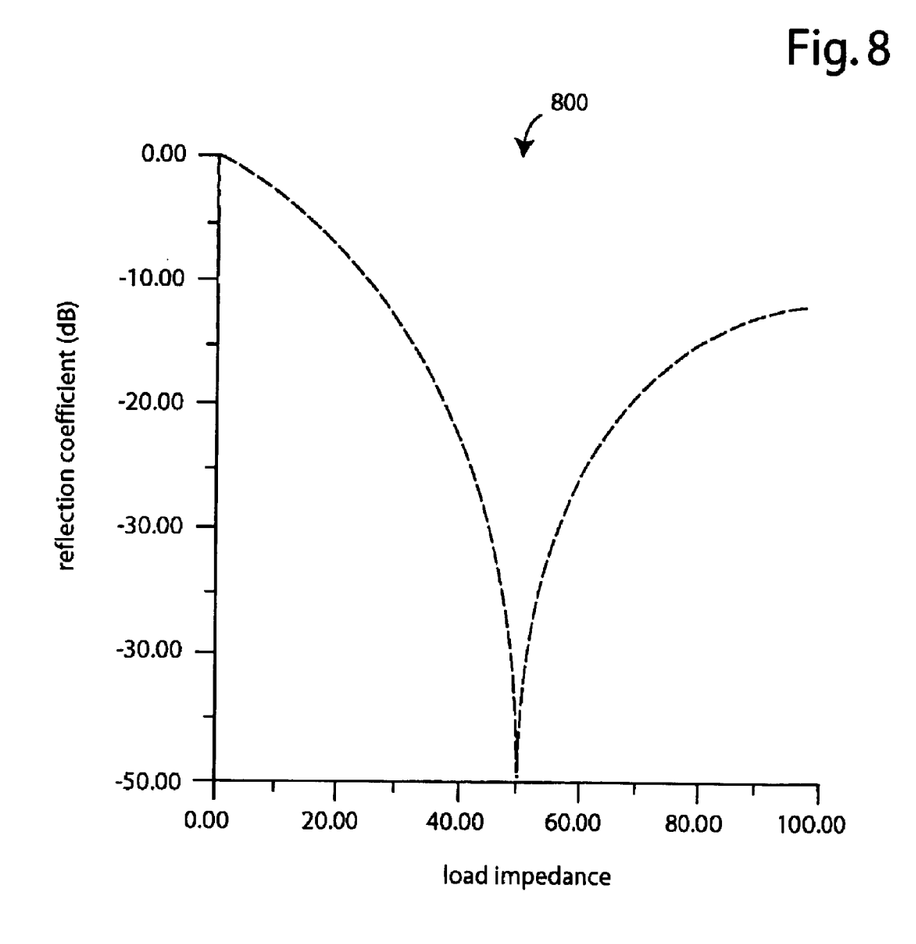
FIG. 8 is a graph of the theoretical impedance response of a directional-coupler reflection port of FIG. 1.

FIG. 8 illustrates the theoretical impedance response 800, e.g., as seen at the reflected-wave sample port of directional coupler 610. The applied signal ($e_o$) from isolation amplifier 608 is assumed to be constant. Detection sensitivity is best on the steepest parts of the curve. Sensitivity is maximum when the RMPA driving point impedance matches the characteristic impedance of the directional coupler.

A method embodiment of the present invention provides for the calibration of such RMPA sensor antennas. Sets of polynomial equations are constructed with independent variables (H) that allow any given antenna driving point impedance value to be measured, and represented as a calibration function with independent variable (H). The difference between the measured and calibration polynomial value is used to detect and image the coal seam.

Method embodiments of the present invention can further define such independent variables to be thickness, dielectric constant, or in-situ stress of a geologic media or buried object. The information gathered can be used to construct visual images of the coal seam and its composition.

Referring again to FIG. 6, the crystal oscillator phase shift $\theta_1$ is multiplied by the full multiplication factor $N_o$ and the frequency of the crystal oscillator is multiplied by $N_o$ creating the output frequency $N_o\omega_1$. After filtering, the phase shift $N_o\theta_1$, is canceled on balanced mixer M1. The coupler reflection port voltage $e_R$ dependence on driving point impedance is mathematically represented by Equation (3). The reflection coefficient ($\Gamma$) is a complex number that can be represented as a vector magnitude with phase angle $\theta_R$. Using trigonometric identities and applying filter theory, it can be shown that, $$F_8I = k\Gamma \cos \theta_R$$

and $$F_8Q = k\Gamma \sin \theta_R \tag{12}$$

The ratio of these direct current (DC) values can be used to solve for the inverse tangent values. And the reflection phase angle $\theta_R$ can be readily determined. Calibration of the instrument will determine the correct constant K. The magnitude of the reflection coefficient can be found from either of the above two equations. The circuits isolate the phase shifter from any blaring reflected signal. The measured values of $\Gamma$ and $\theta_R$ can be applied in Equation (3) to determine the driving point impedance.

The following equations help further describe the necessary working conditions of the ground-penetrating radar system 600 in FIG. 6, and illustrate what each functional element must do to process the signals involved. FR is the reflected-wave output from the reverse port of directional coupler 610. FX is the output of oscillator 603. F0 is the output of PLL 604. F1 is the output of PLL 618. F2 is the output of PLL 628. F3 is the output of PLL 633. F4I and F4Q are the selected in-phase and quadrature outputs of phase shifter 620. F5 is the output of mixer 622. F6 is the output of mixer 616. F6' is the filtered output of bandpass filter 626. F7 is the output of mixer 630. F7' is the filtered output of bandpass filter 632. F8 is the output of mixer 634. F8' is the filtered output of bandpass filter 636.

$$FX = A \cos(\omega_1 t + \theta_1)$$

$$F0 = B \cos(N_0\omega_1 t + N_0\theta_1)$$

$$F1 = C \cos(N_1\omega_1 t + N_1\theta_1)$$

$$F2 = C \cos(N_2\omega_1 t + N_2\theta_1)$$

$$F4I = D \cos(N_0\omega_1 t + N_0\theta_1)$$

$$F4Q = D \sin(N_0\omega_1 t + N_0\theta_1)$$

$$FR = E\Gamma \cos(N_0\omega_1 t + N_0\theta_1 + \theta_R)$$

$$N_2 - N_1 = 1$$

Placing the quadrature hybrid into the 0° position yields:

$$F5I = F1 \times F4I$$
$$= CD\cos(N_1\omega_1 t + N_1\theta_1)\cos(N_0\omega_1 t + N_0\theta_1)$$
$$= \frac{CD}{2}[\cos[(N_1+N_0)\omega_1 t + (N_1+N_0)\theta_1] + \cos[(N_1-N_0)\omega_1 t + (N_1-N_0)\theta_1]]$$

$$F6I = F5 \times FR$$
$$= \frac{CDE\Gamma}{2}\begin{bmatrix}\cos[(N_1+N_0)\omega_1 t + (N_1+N_0)\theta_1] \times \\ \cos(N_0\omega_1 t + N_0\theta_1 + \theta_R) + \\ \cos[(N_1-N_0)\omega_1 t + (N_1-N_0)\theta_1] \times \\ \cos(N_0\omega_1 t + N_0\theta_1 + \theta_R)\end{bmatrix}$$
$$= \frac{CDE\Gamma}{4}\begin{bmatrix}\cos[(N_1+2N_0)\omega_1 t + (N_1+2N_0)\theta_1 + \theta_R] + \\ \cos(N_1\omega_1 t + N_1\theta_1 - \theta_R) + \\ \cos(N_1\omega_1 t + N_1\theta_1 + \theta_R) + \\ \cos[(N_1-2N_0)\omega_1 t + (N_1-2N_0)\theta_1 + \theta_R)\end{bmatrix}$$

After filtering:

$$F^1 6I = \frac{CDE\Gamma}{4}[\cos(N_1\omega_1 t + N_1\theta_1 - \theta_R) + \cos(N_1\omega_1 t + N_1\theta_1 + \theta_R)]$$
$$= \frac{CDE\Gamma}{2}\cos(\theta_R)\cos(N_1\omega_1 t + N_1\theta_1)$$

$$F7I = F2 \times F^1\sigma I$$
$$= \frac{C^2 DE\Gamma}{4}\cos(\theta_R)[\cos(N_2\omega_1 t + N_2\theta_1)\cos(N_1\omega_1 t + N_1\theta_1)]$$
$$= \frac{C^2 DE\Gamma}{4}\begin{bmatrix}\cos[(N_2+N_1)\omega_1 t + (N_2+N_1)\theta_1] + \\ \cos[(N_2-N_1)\omega_1 t + (N_2-N_1)\theta_1]\end{bmatrix}$$

After filtering:

$$F^1 7I = \frac{C^2 DE\Gamma}{4}\cos(\theta_R)\cos[(N_2-N_1)\omega_1 t + (N_2-N_1)\theta_1]$$

where $N_2 - N_1 = 1$, $$F^1 7I = \frac{C^2 DE\Gamma}{4}\cos(\theta_R)\cos(\omega_1 t + \theta_1)$$

$$F^1 8I = FX \times F^1 7I = \frac{AC^2 DE\Gamma}{4}\cos(\theta_R)\cos(\omega_1 t + \theta_1)\cos(\omega_1 t + \theta_1)$$

and applying filter:

$$F^1 8I = \frac{AC^2 DE\Gamma}{4}\cos(\theta_R)$$

Switching the quadrature hybrid to the 90° position and following similar techniques as shown above, reveals that:

$$F^1 8Q = \frac{AC^2 DE\Gamma}{4}\sin(\theta_R)$$

Let $I = F^1 8Q$ and $Q = F^1 8Q$ and thus, $$\Gamma \propto \sqrt{I^2 + Q^2} \text{ and,}$$

$$\theta_R = \tan^{-1}\frac{Q}{I}$$

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A drillstring radar system, comprising:
    an upward-looking radar antenna for mounting to a directional-drilling drillstring behind a steerable drillhead;
    a downward-looking radar antenna for mounting to said directional-drilling drillstring behind said steerable drillhead,
    a ground-penetrating radar transceiver connected to each of the upward-looking and downward-looking radar antennas, and providing for return signal attenuation and phase shift measurements, and for providing from said measurements real-time estimates of the distances transmitted radar signals traveled before being reflected back to a respective antennae; and
    a guidance control providing for steering said drillhead according to said real-time estimates;
    wherein, said real-time estimates are fetched from a calibration table that has in-phase (I) and quadrature-phase (Q) return-signal amplitude measurements as inputs.

2. The system of claim 1, further comprising:
    a dielectric-constant sensor associated with the upward-looking and downward-looking radar antennas and providing corrective data to said real-time estimates of the distances provided by the ground-penetrating radar transceiver.

3. The system of claim 1, further comprising:
    a docking mechanism for remote disconnection of the ground-penetrating radar transceiver from said directional-drilling drillstring; and
    a tether for causing the docking mechanism to release the ground-penetrating radar transceiver and allowing it to be withdrawn from within the length of said drillstring.

4. The system of claim 1, further comprising:
    a docking mechanism for remote automatic connection of the ground-penetrating radar transceiver to said directional-drilling drillstring with the aid of hydraulic pumping to shuttle it to a distal end.

5. The system of claim 1, further comprising:
    a user display for providing tomographic images of a coal bad to an operator from data provided by the ground-penetrating radar transceiver.

6. The system of claim 5, further comprising:
    a signal repeater located along said drillstring between the user display and the ground-penetrating radar transceiver and providing for extended communication between them.

7. The system of claim 1, further comprising:
    a navigation processor connected to sense the course taken by said directional-drilling drillstring and for providing information to the guidance control.

8. The system of claim 1, further comprising:
    a hydroelectric generator for receiving a hydraulic flow through said drillstring and for powering the ground-penetrating radar transceiver.

9. The system of claim 8, further comprising:
    a magnetic clutch for coupling in mechanical power to the hydroelectric generator collocated with the ground-penetrating radar transceiver inside an explosion-proof enclosure.

10. The system of claim 1, further comprising:

an inductive coupler for supporting a radio communication along said drillstring acting as a transmission line.

11. A method or drilling, comprising:

using a radar antenna mounted to a directional-drilling drillstring behind a steerable drillhead to radar-scan surrounding rock, and to collect in-phase (I) and quadrature-phase (Q) return-signal amplitude measurements;

finding the depth to a boundary rock interface by operating a ground-penetrating radar transceiver connected to the radar antenna, and deriving from said I and O return-signal amplitude measurements boundary rock interface depth estimates fetched from a calibration table.

12. A method of drilling, comprising:

using an upward-looking radar antenna mounted to a directional-drilling drillstring behind a steerable drillhead to radar-scan above, and to collect in-phase (I) and quadrature-phase (Q) return-signal amplitude measurements;

using a downward-looking radar antenna mounted behind said steerable drillhead to radar-scan below, and to collect I and Q return-signal amplitude measurements;

finding the depth to a boundary rock interface by operating a ground-penetrating radar transceiver connected to each of the upward-looking and downward-looking radar antennas, and deriving from said I and Q return-signal amplitude measurements boundary rock interface depth estimates fetched from a calibration table.

13. The method of claim 12, further comprising:

steering said drillhead according to said real-time estimates with a guidance control.

14. The method of claim 12, further comprising:

manipulating radar frequencies from said ground-penetrating radar transceiver for best transmission penetration and receiver sensitivity on-the-fly as different kinds of media and objects are inspected.

* * * * *